April 13, 1926. Re. 16,318
E. C. SMITH
DRIVE MECHANISM FOR MANURE SPREADERS
Original Filed Sept. 18, 1919
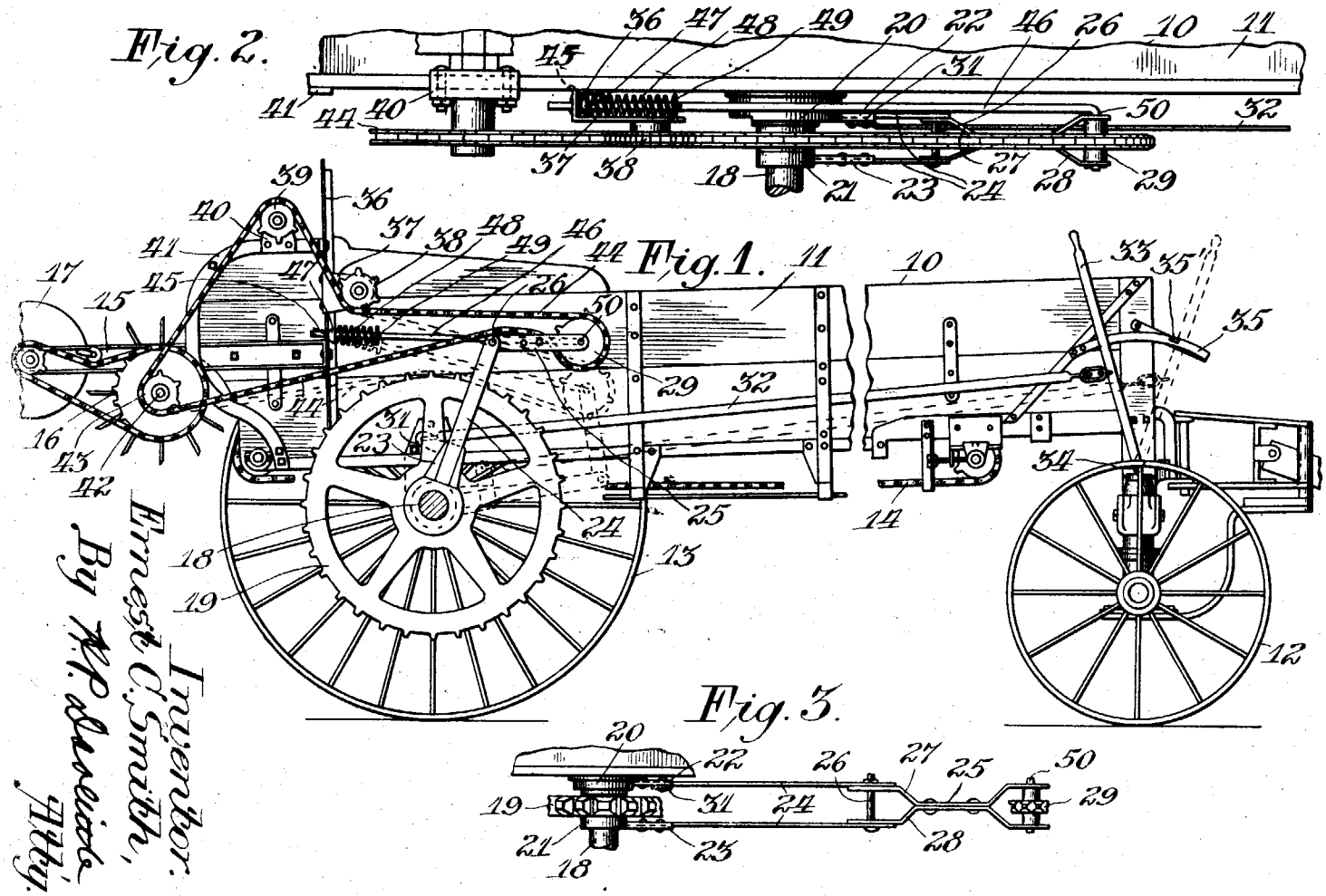
Inventor.
Ernest C. Smith,
By H. P. Deveiode
Atty.

Reissued Apr. 13, 1926.

Re. 16,318

UNITED STATES PATENT OFFICE.

ERNEST C. SMITH, OF PAW PAW, MICHIGAN, ASSIGNOR TO INTERNATIONAL HARVESTER COMPANY, A CORPORATION OF NEW JERSEY.

DRIVE MECHANISM FOR MANURE SPREADERS.

Original No. 1,486,930, dated March 18, 1924, Serial No. 324,572, filed September 18, 1919. Application for reissue filed August 4, 1924. Serial No. 730,120.

*To all whom it may concern:*

Be it known that I, ERNEST C. SMITH, a citizen of the United States, residing at Paw Paw, in the county of Van Buren and State of Michigan, have invented certain new and useful Improvements in Drive Mechanism for Manure Spreaders, of which the following is a full, clear, and exact specification.

This invention relates to a driving mechanism and is particularly adapted for a machine in which a source of power is to be connected to and disconnected from the driven elements of the machine.

One of the objects of the invention is to provide an improved means for connecting the source of power to the movable elements of the machine.

A further object is to simplify and improve the construction and operation of such a device, with a particular view of minimizing the possibility of breakage and disarrangement of the operative parts thereof.

A further object is to provide a means for automatically locking the driving mechanism in inoperative position.

More specifically it is an object of this invention to provide in a manure spreader having the usual driving sprocket wheel, an endless chain extending therepast in the form of a loop, the lower run of the chain adapted to be held on the wheel by a yielding tension device, and when said chain is disengaged therefrom to be held out of engagement therewith by means acting independently of the tension device, the chain being kept taut by said tension device in all positions of adjustment.

Briefly stated, the structure illustrating the invention comprises an endless driving member, such as a chain movable into and out of engagement with the driving member which for the purpose of illustration is shown herein as the driving sprocket wheel of a manure spreader.

In the accompanying drawings I have illustrated one embodiment which my invention may assume in practice, and in these drawings:

Fig. 1 is a side elevational view, partly in section, of a manure spreader embodying my invention;

Fig. 2 is an enlarged top plan view of the driving mechanism showing the relative position of adjacent parts; and Fig. 3 is an enlarged top plan detailed view of the toggle connection.

The invention is preferably applied to a manure spreader 10, of the general type provided with a receptacle 11, the usual fore carrying wheels 12, traction rear wheels 13, endless apron 14 operatively connected to the traction wheels 13 in any preferred manner. Rearwardly extending from and fixed to the sides of the receptacle 11 are two oppositely disposed supporting beams 15 (one of which is shown) on which are journaled a beater 16 and a distributor 17 positioned adjacent the delivery end of the endless apron 14. The traction wheels 13 (one of which is shown) are keyed to the shaft 18 mounted on the bearings (not shown) fixed to the spreader 10. A sprocket 19 is fixed to the shaft 18 and positioned between one side of the manure spreader 10 and one of the traction wheels 13. Journaled on the shaft 18 and positioned on the opposite sides of the drive sprocket 19 are two collars 20 and 21 which have outwardly extending sprockets 22 and 23 preferably formed integrally therewith for the reception of the link members 24 secured thereto by means of rivets. (See Figs. 2 and 3.) The free ends of the link members 24 are pivotally connected to the link 25 by means of a bolt 26. Link 25 is preferably made of two pieces of material 27 and 28 securely riveted together and constructed in such a manner as to form a rigid forked support which receives a sprocket 29 journaled on the upper end of said link. The bolt 26 and forked link 25 also function to engage and support the lower run of the endless drive chain, at a point intermediately of its ends, clear of the sprocket wheel 19 when the chain is in its disengaged position. Socket 22 has rigidly secured thereto a laterally extending arm 31, the free end of which is pivotally connected to an adjustable connecting rod 32. This rod 32 is pivoted to the lever 33 which in turn is pivoted to the manure spreader at 34. The lever 33 is operable within the limits of an arcuate guide 35 and adapted to lock in one position in the notch 35′ as is shown in Fig. 1, when the driving mechanism is in operative position. Secured to the rear of the receptacle 11 of the manure spreader is a frame member 36 which has a bracket member 37 fixed thereto. Journaled on this bracket 37 and positioned in the plane of the driving sprocket 19 is an idler sprocket 38. To the rear of and slightly above the sprocket 38 is a sprocket 39 fixed to the shaft of the secondary beater which is journaled on the bracket 40 fixed to a curved supporting member 41, which is securely fastened to the member 36, the beam 15 and to the side of the receptacle 11. The beater 16 is mounted on a shaft 42 supported in the bearings (not shown) secured to the beams 15. One end of the shaft 42 is provided with a sprocket 43 and is operatively connected with the driving sprocket 19 by means of an endless chain 44, which passes around the sprockets 29, 38, 39 and 43.

In connection with my invention I have provided a means for retaining a constant tension on the chain 44 when this chain is disposed in operative and inoperative positions. This means comprises a support or rod 46 which is free to reciprocate through an aperture 45 in the member 36. The rod 46 is provided with a washer 47 which positions a spring 48 centrally with respect to said rod. Spring 48 is held in position by the washer 47 on one end and a cotter pin 49 at the other end. The forward end of the rod 46 has a right-angularly bent portion 50 which forms the bearing for the sprocket 29 on the free end of the toggle link. The above described mechanism is assembled by inserting the rod 46 in the aperture 45 of the member 36 under the tension of the spring 48, which maintains the endless drive chain 44 relatively taut in all positions.

The control for the above described driving mechanism acts independently of the yielding support just described and comprises the hand lever 33 which when shifted from full line position (inoperative position) to the dotted line position (operative position) shown in Fig. 1, oscillates the links 24 about their pivots on the driving shaft 18 by means of the connections 31 and 32. As the links 24 are swung about their pivots, the link 25 and sprocket 29 are carried with them to a position in which the endless drive chain 44 engages the drive sprocket 19. These members are locked in this position by means of lever 33 which engages the notch 35′ with the usual detent lock (not shown). It will be seen that throughout the shift from one position to another, the drive chain 44, due to the relative position of the sprockets, does not vary in tension to any appreciable degree, but it is also to be noted with the construction here shown that a constant spring tension is maintained on the drive chain. It is further to be noted that the drive chain 44 is automatically locked in an inoperative position, or held out of engagement with the driving sprocket 19 by means of the toggle link, as clearly shown in Fig. 1. It will also be appreciated that the toggle construction of the lifting mechanism provides an effective means in the bolt 26 and adjacent forked piece 25 for engaging the lower run of the endless drive chain to flex it upwardly and hold it clear of the sprocket wheel 19 in the disengaged position of the chain.

While I have in the above specification described one embodiment which my invention may assume, it should be understood that the invention is capable of modifications, and that modifications may be employed without departing from the spirit and scope of the invention, as expressed by the following claims.

1. In a driving mechanism, an axle, traction wheels supporting the axle and adapted to impart rotation thereto, a driving sprocket mounted on the axle, an endless drive chain positioned in operative relation with respect to said sprocket, and means including a link movable concentrically with respect to said sprocket for engaging and disengaging said drive chain and said sprocket.

2. In a driving mechanism, an axle, traction wheel supporting the axle and adapted to impart rotation thereto, a driving sprocket mounted on the axle, an endless drive chain positioned in operative relation with respect to said sprocket, and means mounted on said axle for engaging and disengaging said drive chain and said sprocket.

3. In a driving mechanism, a drive shaft, a driving sprocket mounted on said drive shaft, an endless drive chain positioned in operative relation with respect to said sprocket, and means mounted on said drive shaft and comprising a toggle link for connecting and disconnectng said drive chain and said sprocket.

4. In a driving mechanism, an axle, traction wheels supporting the axle and adapted to impart rotation thereto, a driving sprocket mounted on the axle, an endless drive chain positioned in operative relation with respect to said sprocket, and oscillatory means mounted on said axle for engaging and disengaging said drive chain and said sprocket.

5. In a driving mechanism, a drive shaft, a driving sprocket mounted on said drive shaft, an endless drive chain positioned in operative relation with respect to said sprocket, means for connecting and disconnecting said drive chain and said sprocket, and means for maintaining an even tension on said drive chain in connected and disconnected positions.

6. In a driving mechanism, a drive shaft, a driving sprocket mounted on said drive shaft, an endless drive chain positioned in operative relation with respect to said sprocket, means for connecting and disconnecting said drive chain and said sprocket, and resilient means for maintaining an even tension on said drive chain in all positions.

7. In a driving mechanism, a drive shaft, a driving sprocket mounted on said drive shaft, an endless drive chain positioned in operative relation with respect to said sprocket, a toggle link mounted on said drive shaft, and means connected to said toggle link for maintaining a constant tension on said drive chain.

8. In a driving machanism, a drive shaft, a driving sprocket mounted on said drive shaft, an endless drive chain positioned in operative relation with respect to said sprocket, a toggle link mounted on said drive shaft, and resilient means connected to said toggle link for maintaining a constant tension on said drive chain.

9. In a driving mechanism for a manure spreader, a drive shaft, a driving sprocket mounted on said drive shaft, an endless drive chain positioned in operative relation with respect to said sprocket, means for engaging and disengaging said drive chain and said drive sprocket, and means for automatically locking said drive chain in a disengaged position.

10. In a driving mechanism for a manure spreader, a drive shaft, a driving sprocket mounted on said drive shaft, an endless drive chain positioned in operative relation with respect to said sprocket, means for engaging and disengaging said drive chain and said drive sprocket, and means including a toggle link for automatically locking said drive chain in a disengaged position.

11. In a driving mechanism for a manure spreader, a drive shaft, a driving sprocket mounted on said drive shaft, an endless drive chain positioned in operative relation with respect to said sprocket, means for engaging and disengaging said drive chain and said drive sprocket, and means mounted on said drive shaft for automatically locking said drive chain in a disengaged position.

12. In a driving mechanism for a manure spreaded, a drive shaft, a driving sprocket mounted on said drive shaft, an endless drive chain positioned in operative relation with respect to said sprocket, means for engaging and disengaging said drive chain and said drive sprocket, and oscillatory means mounted on said drive shaft for automatically locking said drive chain in a disengaged position.

13. In a driving mechanism for a manure spreader, a drive shaft, a driving sprocket mounted on said drive shaft, an endless drive chain positioned in operative relation with respect to said sprocket, a toggle link mounted on said drive shaft, and reciprocable means connected to the free end of said toggle link for maintaining a constant tension on said drive chain.

14. In a driving mechanism for a manure spreader, a drive shaft, a driving sprocket mounted on said drive shaft, an endless drive chain positioned in operative relation with respect to said sprocket, a toggle link mounted on said drive shaft, and spring pressed reciprocable means connected to the free end of said toggle link for maintaining a constant tension on said drive chain.

15. In a driving mechanism for a manure spreader, a drive shaft, a driving sprocket mounted on said drive shaft, an endless drive chain positioned in operative relation with respect to said sprocket, a toggle link mounted on said drive shaft, a sprocket mounted on the free end of said toggle link, and a spring pressed reciprocable rod connecting the free end of said toggle link to said manure spreader for maintaining an even tension on said drive chain.

16. In a driving mechanism, a drive shaft, a driving sprocket mounted on said drive shaft, an endless drive chain positioned in operative relation with respect to said sprocket, means for adjusting said chain, and means for maintaining a constant tension on said drive chain in all positions of adjustment.

17. In a driving mechanism, a drive shaft, a driving sprocket mounted on said drive shaft, an endless drive chain positioned in operative relation with respect to said sprocket, means for adjusting said chain, and resilient means for maintaining a constant tension on said drive chain in all positions of adjustment.

18. In a driving mechanism, a drive shaft, a driving sprocket mounted on said drive shaft, an endless drive chain positioned in operative relation with respect to said sprocket, means for adjusting said drive chain, a toggle link mounted on said drive shaft, and means connected to said toggle link for maintaining a constant tension on said drive chain in all positions of adjustment.

19. In a driving mechanism for a manure spreader, a drive shaft, a driving sprocket mounted on said drive shaft, an endless drive chain positioned in operative relation with respect to said sprocket, a toggle link mounted on said drive shaft, and reciprocable means connected to the free end of said toggle link for automatically locking said drive chain in a disengaged position.

20. A driving mechanism for a manure spreader, a drive shaft, a driving sprocket mounted on said drive shaft, an endless drive chain positioned in operative relation with respect to said sprocket, a toggle link mounted on said drive shaft, and spring pressed reciprocable means connected to the free end of said toggle link for maintaining a constant tension on said drive chain and automatically locking said drive chain in a disengaged position.

21. In a driving mechanism for a manure spreader, a drive shaft, a driving sprocket mounted on said drive shaft, an endless drive chain positioned in operative relation with respect to said sprocket, a toggle link mounted on said drive shaft, and reciprocable spring pressed means connected to the free end of said toggle link for automatically locking said drive chain in a disengaged position.

22. In mechanism of the class described, upper and lower gear elements to be driven, a swinging arm, an idler carried thereby, a driving gear element located between the first mentioned gear elements and the said arm, an idler located above the driving gear element, a flexible gear element trained about both of the first mentioned gear elements and the first mentioned idler and having its upper stretch passing beneath the last mentioned idler and its lower stretch extending above the driving gear element and adapted to be moved into and out of engagement therewith by the first-mentioned idler through the swinging of said arm, and a device carried by the swinging arm to engage beneath the lower stretch of the flexible gear element to form a supplemental bight in said element adjacent the idler on the arm as the flexible gear element is withdrawn from the driving gear element whereby dropping of the flexible gear element onto the driving gear element will be prevented.

23. In a spreader, distributing mechanism, a driving sprocket wheel, an endless sprocket chain associated with said mechanism to drive the same extending in a loop past one side of said wheel, a yieldable tension device engaged with said loop and adapted to hold one run thereof against the sprocket wheel and at the same time keep the chain taut in all positions of adjustment, and means acting independently of said tension device for holding the aforesaid run of the loop clear of the sprocket wheel.

24. In combination, a driving sprocket wheel, mechanism to be driven, an endless sprocket chain extending from said mechanism in a loop past one side of said wheel, a yieldable tension device acting on said loop adapted to hold that run nearest the wheel in contact with the wheel and to maintain the chain taut in all positions of adjustment, and means acting independently of said tension device for holding the aforesaid run of the loop clear of the wheel by flexing it toward the opposite run.

25. In combination, a sprocket wheel, an endless sprocket chain extending in a loop past one side of said wheel, a second sprocket wheel arranged in the end of said loop, means yieldingly supporting said second sprocket wheel adapted to hold one run of said chain in engagement with the first mentioned sprocket wheel and to maintain the chain taut in all positions of adjustment, and means acting directly on the aforesaid run of the loop for holding it clear of the first mentioned sprocket wheel when the chain is in its disengaged position.

26. In combination, two sprocket wheels, an endless sprocket chain extending past one side of the first of the sprocket wheels in the form of a loop passing around the second of said sprocket wheels, a yieldable support for the second of said sprocket wheels adapted to move it in a direction to take up slack in the chain in all positions of adjustment thereof and to hold one run of the chain against the first sprocket wheel, and means acting independently of said support for holding only the aforesaid run of the chain to support the chain clear of the first sprocket wheel.

27. In combination, a sprocket wheel, an endless sprocket chain extending past one side of said wheel in a loop lying in the plane of said wheel, a yieldable tension device acting on the closed end of the loop to take up the slack in the chain and yieldingly hold one run of the loop in engagement with said sprocket wheel, and an arm carrying means acting directly on said run of the loop and intermediate the ends thereof to hold it away from the sprocket wheel.

28. In a spreader, distributing mechanism, a driving sprocket wheel, an endless sprocket chain associated with said mechanism to drive the same extending in a loop past one side of said wheel, the chain adapted to engage and disengage with the wheel, a yieldable tension device engaging the loop of the chain for holding the chain taut in all positions of adjustment, and means independent of said tension device for supporting and holding the lower run of the chain at a point intermediately of its ends clear of the sprocket wheel when the chain is in its disengaged position.

In testimony whereof, I affix my signature.

ERNEST C. SMITH.